UNITED STATES PATENT OFFICE.

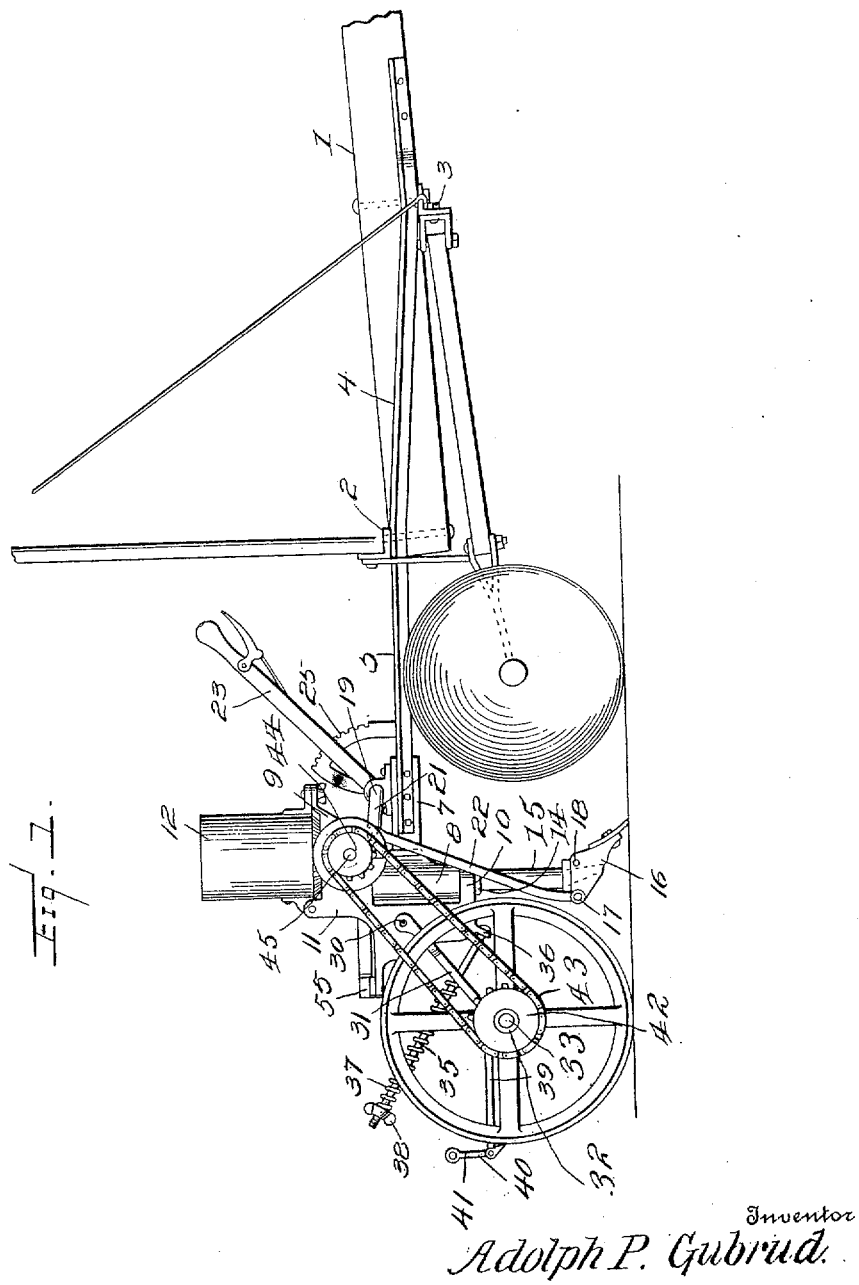

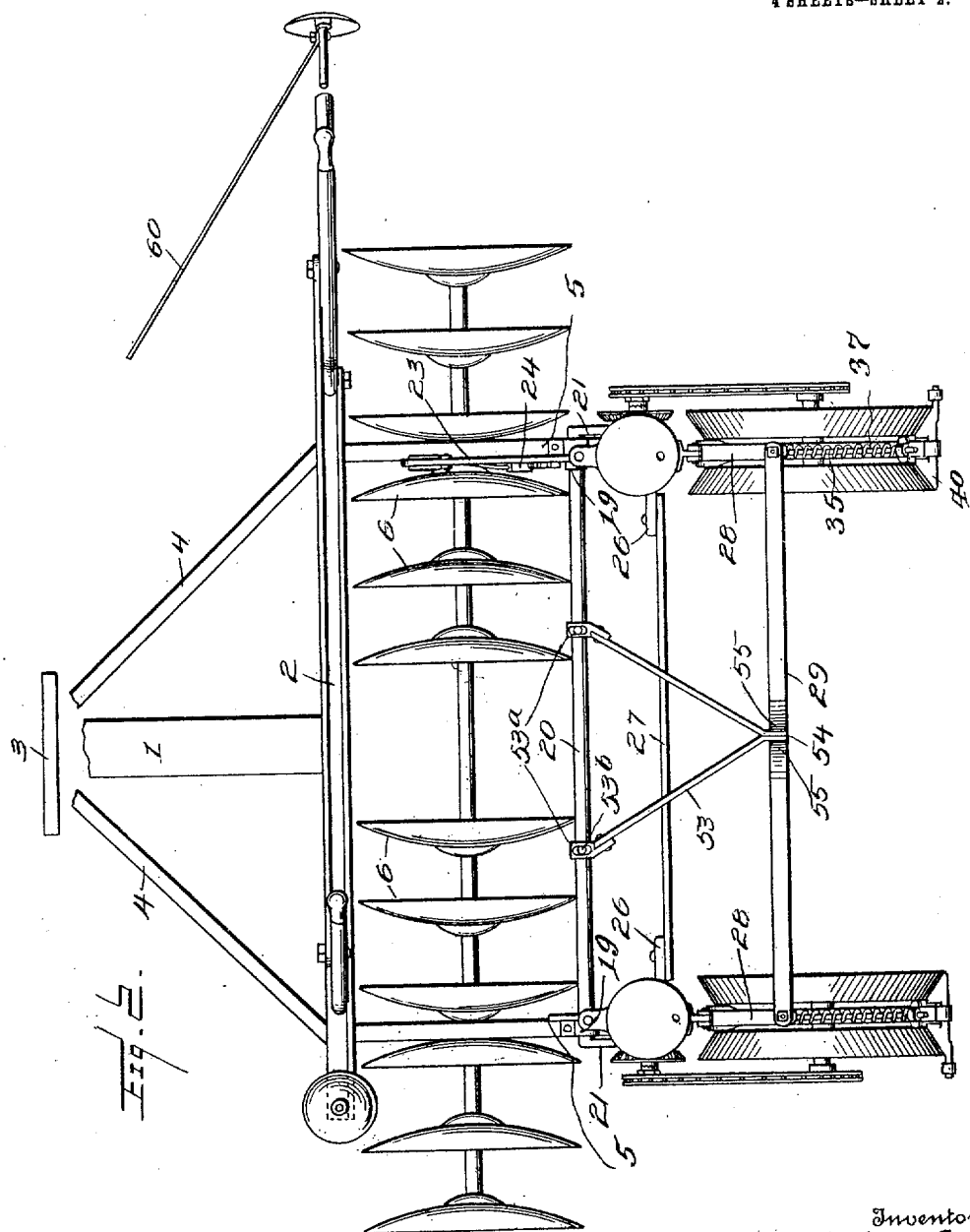

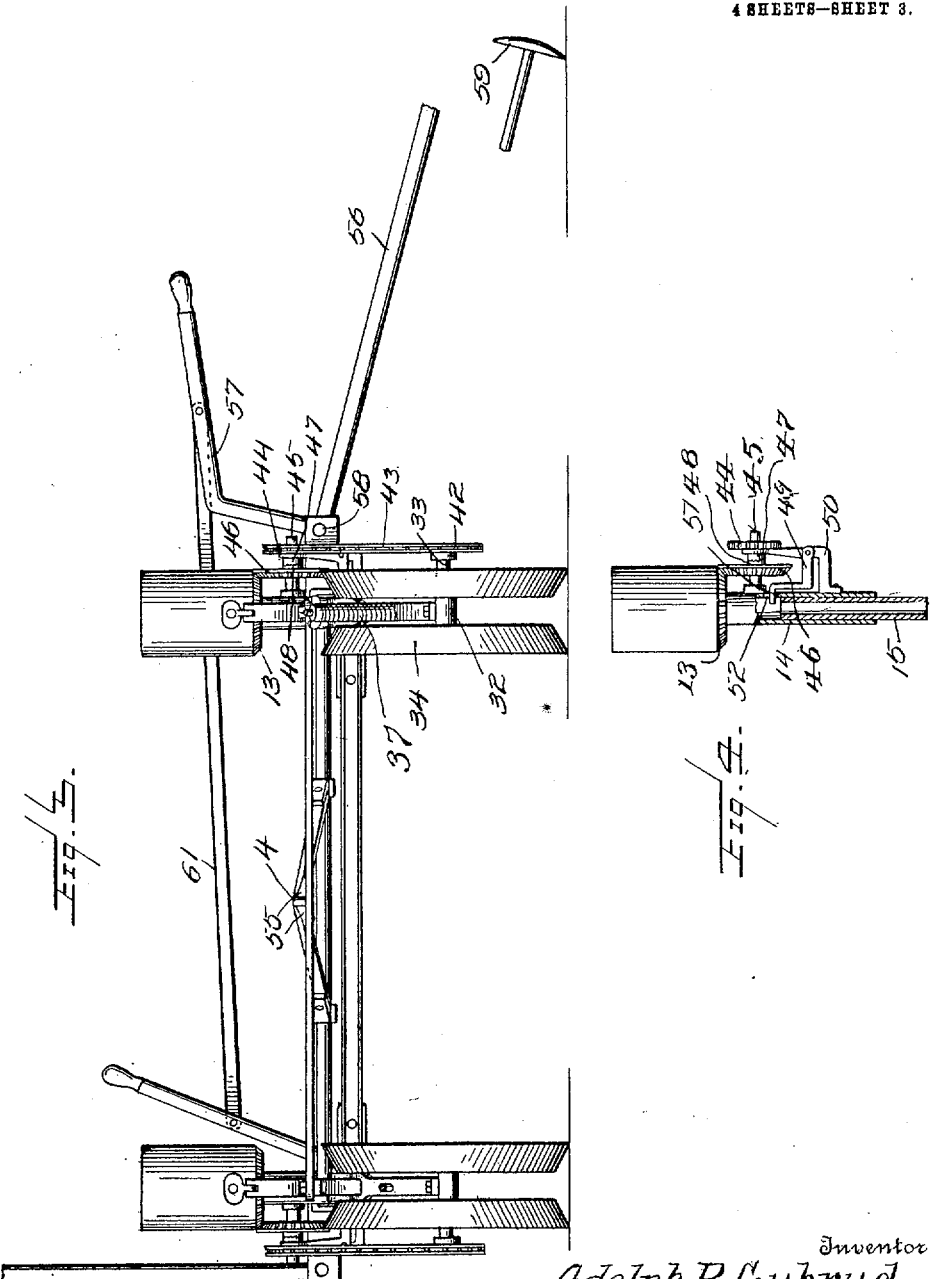

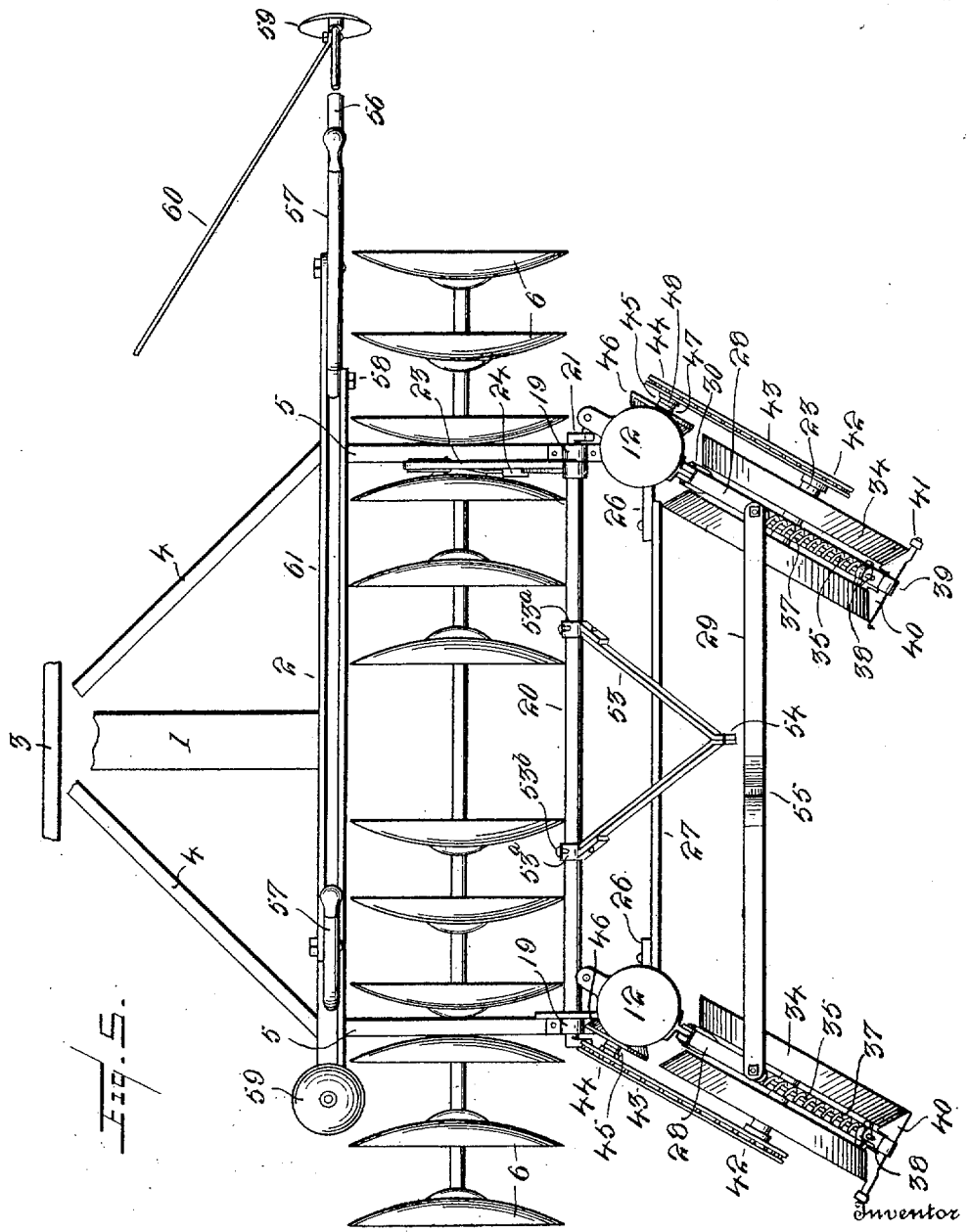

ADOLPH P. GUBRUD, OF HUDSON, SOUTH DAKOTA.

CORN-PLANTER.

966,908.     Specification of Letters Patent.     Patented Aug. 9, 1910.

Application filed August 17, 1909. Serial No. 513,230.

*To all whom it may concern:*

Be it known that I, ADOLPH P. GUBRUD, a citizen of the United States, residing at Hudson, in the county of Lincoln and State of South Dakota, have invented new and useful Improvements in Corn-Planters, of which the following is a specification.

This invention relates to a machine for planting corn and other seed, and one of its principal objects is to provide a construction in which the covering wheels and parts of the drilling mechanism are adapted to be locked rigidly to the frame to follow a straight course in planting and to be released for a free turning movement of the machine at the ends of rows and greater convenience in transporting the implement from place to place.

A further object of the invention is to provide simple and effective means for locking and releasing said elements and simultaneously throwing the seed dropping mechanism into and out of action and to provide also simple and effective means for regulating the depth of penetration of the drill hoes.

A still further object of the invention is to provide a planter which may be used in conjunction with ground preparing and ridging means of the type shown in my Patent #766,823, dated August 9, 1904, or in my Patent No. 928,122, dated July 13, 1909, whereby an effective organized ground preparing and planting implement may be produced.

With these and other objects in view, the invention consists of the features of construction, combination and arrangement of parts hereinafter fully described and claimed, reference being had to the accompanying drawings, in which:—

Figure 1 is a side elevation of a corn planter embodying my invention. Fig. 2 is a top plan view of the same. Fig. 3 is a rear elevation. Fig. 4 is a view in rear elevation of one of the seed boxes and a vertical section of the associated dropper mechanism. Fig. 5 is a top plan view showing the rear frame in one of its laterally swung positions.

Referring to the drawings, the numeral 1 designates a draft pole or tongue, to which are secured cross bars 2 and 3 reinforced by diagonal braces 4. The braces 4 are formed by the front portions of rearwardly extending parallel bars 5. Arranged in rear of the cross bar 2 on opposite sides of the central line of the implement are series or gangs of pulverizing disks 6, which are adapted to furrow and otherwise prepare the soil for the reception of the corn or other seed by the clamping mechanism hereinafter described. These disks may be constructed and arranged in operation in the manner shown in my aforesaid Patent #766,823, or in the manner shown in my aforesaid Patent #928,122. The disks are shown simply for the purpose of indicating their arrangement with relation to the planting devices, no specific illustration or description thereof being necessary, as they form no part of the present invention. The rear ends of the bars 5 have secured thereto brackets 7 provided with vertically disposed knuckles or sleeves 8. These knuckles or sleeves fit between the upper and lower portions 9 and 10 of bifurcated brackets 11, the portion 9 of each of which supports a seed box or hopper 12, one of which is arranged at each side of the machine, as shown, for planting two rows at a time. Each hopper is provided with the usual seed plate or dropping device, not shown, which is actuated by beveled gears 13 and 46, the seed being discharged into a depending dropper or conducting tube 14 telescopically receiving the upper end of a discharge tube 15, which tubes extend through the portions 9 and 10 of the bifurcated bracket and through the bore of the sleeve 8, and thus form the pintle of a pivotal connection between the bracket and bar 5, whereby the bracket is adapted to have independent lateral swinging movement.

The lower end of the discharge tube or pipe 15 communicates with a drill hoe or shovel 16 which is pivotally mounted on a stud 17 carried by said tube and is fixed against pivotal movement to the tube by a pin 18. This pin is preferably formed of wood or other comparatively light material which is adapted to break under strain, as when the hoe comes in contact with a rock or other hard object, by which the hoe will be released for rearward pivotal movement to prevent injury thereto.

The bars 5 are provided with bearings 19 for a transverse rock shaft 20, acting incidentally as a bracing connection, which shaft is provided at each end with a crank arm 21 connected by a link 22 with the stud 17 of the adjacent discharge tube, whereby, through reverse locking movements of said shaft, the hoe 16 may be depressed to penetrate the soil to a desired depth or elevated to clear the ground in the transportation of the implement from place to place. A lever 23 is connected with the shaft and provided with a dog or pawl 24 to one of the bars 5, whereby the shaft may be operated and secured in adjusted position.

The brackets 11 are provided with inwardly extending arms 26 loosely jointed to and coupled by a transverse brace bar 27 and rearwardly extending arms 28 loosely jointed to and coupled by a transverse brace bar 29, the said brackets 11 and parts 26 and 27, 28 and 29 constituting a rear or trail parallel motion frame which supports the planting devices and swings on the tubes 14 as centers of motion to carry the wheels 34 in either direction laterally.

Pivoted, as at 30, at their forward ends to the respective brackets 11 are downwardly and rearwardly extending draft bars 31 provided at their lower free ends with bearings 32 for shafts 33, each carrying a concaved covering wheel 34 composed of divided sections. Through each of said draft bars 31 extends a rod 35 inclined upwardly and rearwardly and connected with the adjacent bracket at one end, as at 36. Surrounding said rod is a coiled spring 37 whose pressure may be regulated by a nut 38 engaging the upper rear end of the rod. The springs 37 exert downward pressure on bars 31 to maintain the covering wheel in contact with the surface of the ground, while permitting them to have pivotal motion in a vertical plane to pass over the irregularities of surface and obstructions without injury. The degree of pressure of the covering wheels on the soil may be regulated at any time by tensioning the springs through the medium of the nuts 38. Arms 39 project rearwardly from the bearings 32 between the sections of the respective wheels and carry at their rear ends pivoted scrapers 40 operating by gravity on the surfaces of the wheel sections to remove the soil accumulating thereon. Each scraper is provided with a handle 41 by which it may be swung to an inoperative position and maintained in such position when desired.

On the shaft on each covering wheel is a sprocket wheel 42 connected by a draft chain 43 with a sprocket wheel 44 mounted on a stub shaft 45 suitably journaled on the bracket 11, on which shaft is also loosely mounted a beveled gear 46 meshing with the gear 13, whereby in the travel of the implement the dropper or seed plate of the adjacent hopper 12 will be driven. The hubs of the wheel 44 and gear 46 are provided with ratchet teeth forming clutch toothed portions 47 and 48 to lock the gear 46 to or release it from the shaft, so that the dropping mechanism may be thrown into and out of operation at will. The sprocket wheel 44, which is feathered to slide upon and rotate with the said shaft 45, is suitably connected with one arm of a bell crank shifting lever 49 fulcrumed on a bracket 50 secured to the tube 14, the other arm of which lever is provided with a finger 51 projecting through the slot 52 into said tube 14 so as to be engaged by the upper end of the tube 15 when the latter is forced upwardly into said tube 14, as in the operation of raising the hoe 16 above the ground surface. Such upward movement of the tube 15 will tilt the bell crank lever 49 to slide the sprocket wheel 44 outwardly and thus release its clutch member from engagement with the clutch member of the gear 46, thus disconnecting the latter from fixed engagement with the shaft and arresting the motion of the dropping device. By the devices above described when the shaft 20 is rocked to elevate the planter hoes in transporting the implement from place to place, the seed dropping mechanism may be simultaneously thrown out of action.

It will be observed that the parts 11, 27, 28 and 29 form a rear frame carrying the planting and covering devices, which frame is pivotally connected to have lateral swinging movement on the main or front frame.

In order to lock the rear frame and consequently the planting devices against lateral pivotal movement in the operation of planting, a triangular locking lever or device 53 is fixed to the rock shaft 20 and has its arms provided with sleeves 53ª loosely engaging the shaft 20 and its apex flattened to form an engaging portion 54 to fit down between spring jaws 55 arranged on the bar 29, whereby the brackets and associated parts of the rear frame carrying the planting devices, and covering wheels, will be fixed to the front frame structure so that the planters will operate in straight parallel lines, securing steadiness and rigidity and preventing deflection of the drill hoes and covering wheels. The sleeves 53ª are provided with slots receiving pins 53ᵇ on axle 20 to permit the shaft to be rocked to a determined extent to regulate the depth of penetration of the hoes without releasing the locking devices. By rocking the shaft forwardly a predetermined distance the pins 53ᵇ will couple the shaft to the locking device so that the latter may be thrown out of engagement with the bar 29, thus permitting the rear frame carrying the covering wheels to swing laterally for ease and convenience in adapting the machine to turn at the ends of rows or around corners in the transportation of the machine from place to place.

At the opposite ends of the bar 2 are arranged markers each comprising a tube or rod bent to form an arm 56 and an operating handle or lever 57, said markers being pivotally mounted at the point of intersection of said parts, as at 58, on the bar 2. The arm 56 of each marker carries a marking wheel or disk 59, of any suitable form, and is connected with the bar 3 by a brace 60 pivotally engaging said bar 3. The operating handles or levers of the two marking devices are connected by a link 61, so that when one marking device is thrown downwardly for operation the other will be retracted, and vice versa, as will be readily understood.

From the foregoing description, taken in connection with the drawings, the construction and mode of use of my improved planter will be readily understood, and it will be seen that it provides a planter which is not only simple in construction and under the thorough control of the operator, but in which the covering wheels are given sufficient flexibility to pack the soil and to pass over obstructions without liability of injury. Also it will be seen that by means of simple mechanism the depth of penetration of the rows may be regulated or said hoes and the planting devices simultaneously thrown into or out of operation. By means of the same mechanism the planting devices may be locked rigidly against movement in operation or released for pivotal movement for convenience in steering the implement.

I claim:—

1. A planter embodying a main frame, a rear frame pivoted for lateral swinging movement on the main frame, planting devices carried by said rear frame and each including a hopper, a vertically adjustable drill hoe communicating therewith, seed dropping mechanism, a covering wheel, and means for simultaneously fixing said rear frame from lateral movement, projecting the hoes and throwing the gearing into action, or releasing said rear frame for pivotal movement, retracting the hoes and throwing the gearing out of action.

2. In a planter, the combination of a main frame, a laterally swinging rear frame pivoted thereto, seed boxes mounted on said laterally swinging frame, vertically adjustable drill hoes communicating therewith, seed dropping mechanism covering wheels supporting the swinging frame, gearing for driving the seed dropping mechanism from the covering wheels, and means for simultaneously locking the swinging frame from movement, projecting the hoes and throwing the gearing into operation or for releasing said swinging frame, retracting the hoes and throwing the gearing out of operation.

3. In a planter, the combination of a main frame, a laterally swinging rear frame pivoted thereto, seed boxes mounted on the rear frame and each including a hopper, dropping mechanism, a vertically adjustable drill hoe, a covering wheel, and gearing for driving the dropper mechanism from the covering wheel, a rock shaft, connections between said shaft and the hoes for raising and lowering the latter, associated means for simultaneously throwing the gearing into and out of action, and means actuated by the shaft for locking or releasing the rear frame.

4. In a planter, a main frame, a laterally swinging rear frame carrying planting devices, each including a covering wheel and a vertically adjustable drill hoe, a rock shaft, a locking device actuated thereby to fix or free the planting devices from or for movement, and connections between said shaft and the drill hoes for simultaneously raising and lowering the latter.

In testimony whereof I affix my signature in presence of two witnesses.

ADOLPH P. GUBRUD.

Witnesses:
K. E. JACOBSON,
T. E. COSSILL.